A. E. HAUSER.
AUTOMATIC CLUTCH FOR STEERING DEVICES.
APPLICATION FILED SEPT. 5, 1917.
1,285,153. Patented Nov. 19, 1918.
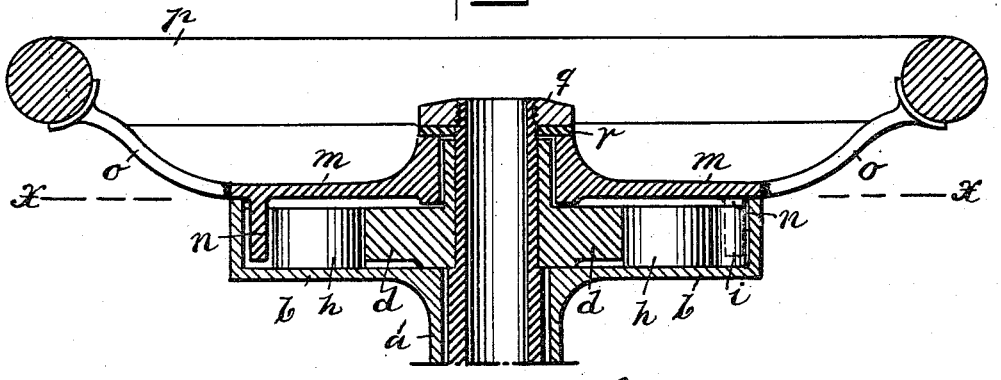
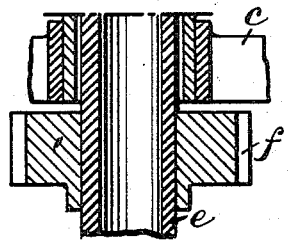
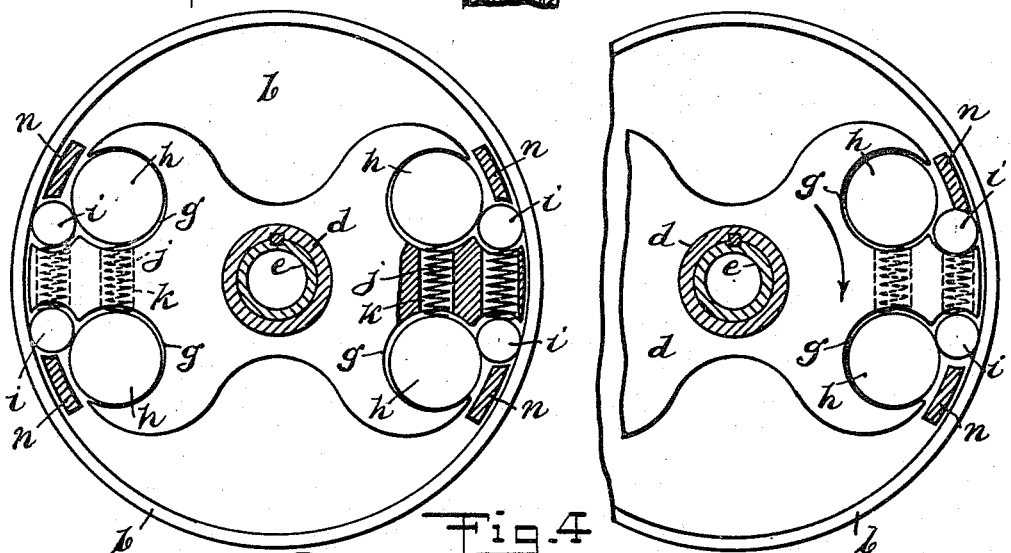
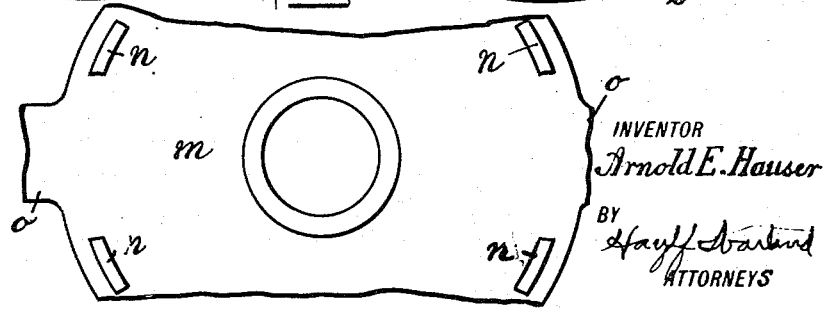
INVENTOR
Arnold E. Hauser
BY
Hauff Garland
ATTORNEYS

UNITED STATES PATENT OFFICE.

ARNOLD E. HAUSER, OF BROOKLYN, NEW YORK.

AUTOMATIC CLUTCH FOR STEERING DEVICES.

1,285,153.

Specification of Letters Patent. Patented Nov. 19, 1918.

Application filed September 5, 1917. Serial No. 189,722.

*To all whom it may concern:*

Be it known that I, ARNOLD E. HAUSER, a citizen of the United States, residing at Brooklyn, county of Kings, and State of New York, have invented new and useful Improvements in Automatic Clutches for Steering Devices, of which the following is a specification.

This invention relates to a clutch for attachment to the steering devices of a motor vehicle or boat, in which a double acting friction clutch is normally locked to a stationary drum, in order to prevent movement of the steering mechanism and obviate accidental oscillation of the hand wheel.

An object of the invention is to eliminate shocks from being transmitted to the hand wheel, sustained by the front wheels of a vehicle or the rudder of a boat caused by hitting an obstruction such as a depression in the roadway, or a floating log.

The invention is designed to permit the control of the clutch to unlock it from the drum by the rotation of the hand wheel when steering the vehicle in any direction.

The novel features of the invention are more fully described in the following specification and claim and illustrated in the accompanying drawing in which:—

Figure 1 represents a vertical section showing the clutch arranged on the steering shaft.

Fig. 2 is a horizontal section taken along the line $x$ $x$ of the same.

Fig. 3 is a similar view showing the parts in a different position.

Fig. 4 is an inverted plan view of a cover.

In this drawing the letter $a$ designates a column having at its upper end a drum $b$ with an open top. The column is provided with a fixture $c$ at its lower end for fastening the column to the frame of a vehicle or other object. In the drum is arranged the clutch devices, including a lever $d$ fixed to a steering shaft $e$ having a pinion $f$ near its lower end adapted for connection with the mechanism for steering the front wheels of a motor vehicle or the rudder of a boat as is well known. The lever is two armed and on the opposite sides of the arms are located recesses or pockets $g$ each being made to receive a roller $h$. The recesses as shown are of peculiar form so as to retain the roller in the recess. Each of the rollers coacts with a roller of smaller diameter $i$ arranged in the drum. Pairs of coiled springs $j$ housed in holes $k$ in the lever will spread the rollers. The latter rollers are arranged in conjunction with the other rollers $h$ to form a wedge and normally press against the inner periphery of the drum.

A cover $m$ is made to fit over the top open portion of the drum. The under portion of the cover is provided with a number of projecting lugs $n$ to at times engage the small clutch rollers $i$ as indicated in Fig. 3, where the cover is shown rotating in the direction of the arrow. The spider $o$ of a hand steering wheel $p$ can form an integral part of the cover as shown, or be fastened thereto. The cover is loosely mounted on the hub of the lever and a nut $q$ prevents the wheel from being displaced from the shaft. A washer $r$ disposed between the lower portion of the nut and the upper hub of the cover, will ease the rotation of the cover.

It will be readily understood, that the wedge rollers $i$ will be forced against the rim of the drum when any shock is given to the steering mechanism including the forward wheels or side twist of the lower portion of the steering shaft. The mere vibration of the vehicle is sufficient by being transmitted to the drum to keep the clutch securely locked to prevent accidental throw of the steering devices and the front wheel connections.

When it is desired to unlock the clutch, the hand wheel $p$ is oscillated to rotate the cover; a pair of the lugs will then push two of the rollers $i$ out of engagement with the periphery of the rim of the drum and the large rollers. The other two small rollers $i$ can then idle along by the rotation of the lever with yielding contact with the rim of the drum.

At the reverse movement of the hand wheel $p$, the last mentioned pair of lugs will move out of contact with the two last mentioned wedge rollers and the other two lugs will coact with the other two rollers $i$ to rotate the shaft $e$ in an opposite direction from the arrow. The drum, of course, will remain stationary while rotating the hand wheel and the lever combined with the lugs will carry the rollers about the axis of the drum. When the hand wheel is stationary or out of action, the small wedge clutch rollers are automatically forced against the rim of the drum by the expansion of the coiled springs, and the steering mechanism below the clutch is securely locked and can only be unlocked by the rotation of the hand wheel. By having each pair of wedge rollers opposite to each other as shown, it gives a double acting clutch in which the wheel *p* can be rotated in any direction to unlock the clutch.

I claim:—

In a clutch the combination with a stationary drum, of two pairs of clutch rollers arranged to engage the inner periphery of the drum, a lever having two pairs of rollers to coact with the first named pairs, springs carried by the lever for spreading the clutch rollers, a cover for the drum, a steering shaft connected to the lever, a hand wheel mounted on the cover, and pairs of lugs on the cover to at times engage two of the rollers.

In testimony whereof I have hereunto set my hand in the presence of two subscribing witnesses.

ARNOLD E. HAUSER.

Witnesses:
WILLIAM MILLER,
WM. E. WARLAND.